Feb. 28, 1928.
O. L. BARNEBEY
1,660,642
METHOD OF TREATING GASES
Original Filed Jan. 2, 1920
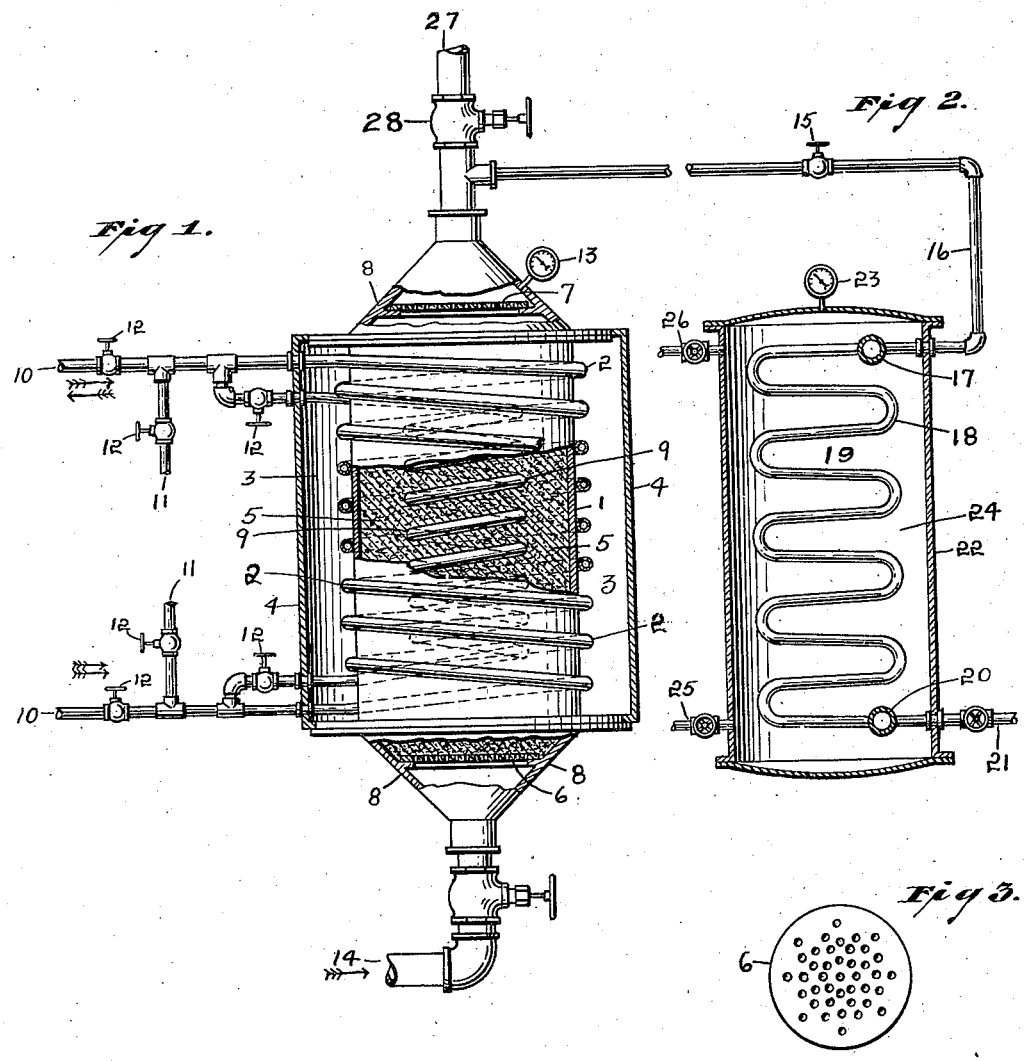
Oscar L. Barnebey
Inventor
By Dwight F. Davis,
The Assistant Secretary of War.
By Chas. Silver
Patent Section C.W.S.

Patented Feb. 28, 1928.

1,660,642

UNITED STATES PATENT OFFICE.

OSCAR L. BARNEBEY, OF COLUMBUS, OHIO, ASSIGNOR TO AMERICAN SOLVENT RECOVERY CORPORATION, A CORPORATION OF OHIO.

METHOD OF TREATING GASES.

Application filed January 2, 1920, Serial No. 348,901. Renewed May 11, 1927.

The present invention relates to a process of liquefying gases wherein a gas is adsorbed by a body of suitable material and then evolved therefrom and liquefied by the effect of pressure, cooling or a combination of pressure and cooling. The invention has for one of its objects the provision of a process for liquefying gases that is efficient and economical and capable of being carried out at low cost.

A further object of the invention is the provision of a process such as last referred to by which diluted gases as well as pure gases can be treated, the treatment effecting first a separation of the diluent gas or gases from the gas to be liquefied and then the liquefaction of the latter.

Another object of the invention is the provision of simple and reliable apparatus for carrying out the process.

Other objects will appear to those skilled in the art upon reference to the following description and claims.

The invention is based on my discovery that activated carbon, by reason of its remarkable adsorbtive properties, can be used effectively and with notable success in the treatment of various gases by a process of the character indicated. Activated carbon is carbon or carbon-containing material which has been given a special treatment making it more active as an adsorbent than the original carbon or carbon-containing material. One of the best treatments to activate carbon is to heat the carbon or carbon-containing material for an extended period of time at temperatures above 700° C., in the presence of steam, the time of the treatment being inversely proportional to the absolute temperature. Carbon prepared in this manner differs radically in its adsorbtive properties from ordinary carbon not so treated. The activated carbon will adsorb gases that are not adsorbed at all by the untreated carbon and gases that are adsorbed to some extent by the untreated carbon are adsorbed in vastly larger amounts by the activated carbon.

In carrying out my process the activated carbon, prepared as above indicated, or other equivalent adsorptive material, is used to adsorb the gas to be liquefied or concentrated. The activated carbon is then heated in a closed system. The heating causes the gas to be driven out of the activated carbon and expands the gas, creating pressure. Then within the closed system a portion is cooled sufficiently to liquefy the gas.

Activated carbon has the capacity to adsorb large quantities of many gases amenable to this treatment. In general it may be stated the lower the temperature the greater the adsorption. First the carbon is partially or wholly saturated with the particular gas for liquefaction. This adsorption may be acomplished within a wide range of temperature depending upon the specific character of the gas. After adsorption is complete or sufficiently so for the purpose at hand, the carbon or activated carbon is heated or allowed to become warm if the temperature is already below room temperature. The amount of heat applied and the rate of applying it is dependent upon the rate of evolution of gas desired. The gas is allowed to enter a cooling chamber cooled by cold water, ice, cold salt brine, expansion of liquefied or compressed gases, such as air, ammonia, etc., or by any other convenient method. The combination of cooling and compression liquefies the gas. The amount of cooling and compression may vary within large limits, the desired temperature being different for different gases. While liquefaction may be accomplished by either, generally a combination of these two effects is desirable.

In order that the invention may be readily and clearly understood reference will now be had to the accompanying drawings showing apparatus suitable for carrying out the process.

In the drawings

Fig. 1 is an elevation with parts of the device illustrated in section and other parts broken away in order to show the internal structure.

Fig. 2 is a perspective view showing the interior of the condenser.

Fig. 3 is a plan view view of the supporting plate shown in Fig. 1.

In Figures 1 to 3, inclusive, is represented one embodiment of the invention which is characterized by the combination cooling and heating tower and liquefying condenser attached.

The tower 1 is surrounded by coil 2 which is within the space 3 in casing 4, which space is provided with suitable heat insulation. The activated carbon 5 is supported in the tower by the perforated plate 6 shown in plan in Fig. 3. Plate 7 is a similar plate placed in the top of the tower above the activated carbon. The plates 6 and 7 are held in place by the special castings 8 which also serve for the intake and exit of gases to and from the tower. The inner coil 9 supplements the coil 2 giving a rapid transfer of heat away from and to the activated carbon as required. The entrance and exits 10 and 11 are the connections for cooling and heating media to be used in the process. The valves 12 give accurate control of the temperature by regulating the flow of cooling and heating media. The gauge 13 indicates the pressure attained. 14 is the intake of the gas to be liquefied. The valve 15 controls the flow of gas from the tower 1 through the pipe 16 to the manifold 17 in the condenser. The cooling coils 18 are continuously cooled by circulating cooling media. The liquefaction occurs for the most part in the coils 18 but partially also in manifolds 17 and 20. Manifold 20 conducts the liquid to the exit 21 from which the liquid is removed. The outer casing 22 completely surrounds the cooling coils 18 and the intervening space 24 is completely filled with cooling media which is kept in constant circulation, being introduced through valve 25 and withdrawn through valve 26. The gauge 23 indicates the pressure within the condenser. It is of course obvious that other suitable forms of condenser may be used instead of this specific form.

The general operation for liquefaction is as follows:

The tower 1 filled with activated carbon is first saturated with the gas to be liquefied by passing the gas into the tower through the opening 14, meanwhile cooling the tower by circulation of ice water, a salt brine, expanding ammonia or air or by some other convenient means. For most gases to be liquefied, the adsorptive power of the carbon is so great that as soon as the air has been replaced by the gas to be liquefied and the temperature becomes lowered the gas is taken up so rapidly that the gauge 13 indicates a partial vacuum being created within the tower. When the gas adsorption is complete, the inflow of gas is stopped and the cooling ceased. The cooling is then started in the condenser and the valve 15 opened to allow gas to flow from the tower to the condenser. At the same time the tower is gradually heated as needed by passing hot water or steam through the coils previously used for cooling purposes, and this results in evolution of gas in large volumes from the adsorbing material. The gauge 23 indicates the pressure. The stop cock regulating the exit of liquid at 21 is opened just enough to remove the liquid into a convenient cooled container as rapidly as formed, yet maintaining sufficient pressure within the system to liquefy the gas. This treatment removes the gas from the tower and liquefies it in the condensing system. When the formation of liquid ceases, the tower is again cooled and saturated again with gas, warmed and process repeated as before. The cycle is maintained repeatedly.

In some cases it is desirable to adsorb the gases under increased pressure, or diminished temperature, or both, and to remove the adsorbed gas by use of diminished pressure, or increased temperature, or both, after which the gas is conveyed or forced by pressure into the cooling system for liquefaction.

Instead of a single unit being used for liquefaction, a double, triple, or multiple unit is equally applicable. The size of the units may be varied to suit the capacity desired.

In fact it is desirable to operate at least two towers at a time in conjunction with the same condenser, inasmuch as one tower can be in process of saturation while the other is evolving gas for liquefaction thus maintaining a more continuous production of the liquid desired.

Certain gases are not adsorbed by activated carbon and when the gas to be liquefied is diluted or mixed with such unadsorbed gases, the latter may be allowed to pass through the carbon tower and then through the condenser without liquefaction or these gases may be by-passed, for example through the conduit 27, and not allowed to enter the condenser. Such gases may then be allowed to waste or collected and otherwise suitably disposed of. After the activated carbon is fully saturated with the gases being adsorbed the by-pass valve 28 is closed, the exit valve regulated and the adsorbed gas or gases liquefied in the usual manner.

While the apparatus here described has been found serviceable for the liquefaction of gases the process is not limited to this specific form of apparatus inasmuch as the fundamental process has a wide range of application. Likewise the use of the principle of this apparatus can be modified in many ways to various shapes and forms of construction to accomplish the same results here obtained.

The invention is further illustrated by the following examples:

*Example I.—Liquefaction of chlorine.*

Chlorine gas from electrolytic vats or some other source is passed through a tower containing activated carbon. The tower is cooled by salt brine circulating through internal and external coils to a temperature approximately −15° C. When saturation of the activated carbon is complete the brine circulation is discontinued and connection made to a cooling coil or chamber likewise cooled by circulating salt brine at this temperature. As the carbon becomes warm it evolves chlorine which then expands into the cooling chamber and compresses and liquefies therein. The activated carbon is finally warmed by passing steam or hot water through the coils previously used for cooling. This treatment drives out still more chlorine thus increasing the yield of liquid chlorine. When most of the chlorine has been liquefied the carbon is again cooled and then again saturated with chlorine and the cycle continuously repeated.

*Example II.—Liquefaction of ammonia.*

The same general method as given in Example I is followed for the liquefaction of ammonia. In this case advantage may be gained by using liquid ammonia for cooling. Evaporation of liquid or compressed air can be likewise used to advantage for the same purpose. The activated carbon adsorbs the ammonia when cooled and upon being warmed or heated gives it up and the cooling chamber collects the ammonia in the liquid form.

*Example III.—Liquefaction of sulfur dioxide.*

The method for making liquid sulfur dioxide is in general the same as that given in Example I for the manufacture of liquid chlorine. The activated carbon is saturated with sulfur dioxide while being cooled by an ice-salt brine or some similar effective means. When the carbon is warmed the sulfur dioxide is given up and expands into the cooling chamber cooled as above and in which the gas collects in liquid form.

It should be noted that the invention is not limited to liquefaction of the gases specifically mentioned. Neither is the invention limited as to the method of manipulation of the process. The general liquefaction process which can be followed using activated carbon as an adsorbent for gases lends itself to many modifications and adaptations. Hence activated carbon can be used for the liquefaction of many gases using the fundamentals of this invention.

Of course, it will be understood that the invention is not limited to the liquefaction of gases for any particular purpose but is intended to apply to all uses where it is desired to transform the substance in question from the gaseous to the liquid state. The fact that the liquefaction is carried out in a closed system makes the process applicable to cyclic liquefaction and re-expansion to the gaseous state. Examples of such applications are found in mechanical refrigeration and in the cyclic recovery, liquefaction and re-use of solvents used in the production of pharmaceutical preparations.

The same principle can be applied to the concentration of gases. If one gas is adsorbed to a greater extent than another then a mixture of the two gases can be passed into, through or both into and through the activated carbon thus adsorbing the one gas and allowing the other gas or gases to pass through without being adsorbed or only slightly adsorbed. Upon heating or evacuating the resultant carbon the adsorbed gas can be removed. In this manner one gas may be separated from another. The same method can be applied to a number of gases to effect their separation. After the gas or gases have been separated from another gas or gases the same may be liquefied by the process outlined above. The gas or gases not adsorbed may likewise be liquefied by application of pressure, cooling or both.

It should be noted that wherever in the appended claims is used the expression "activated carbon" or "activated carbonaceous material" it is intended that this expression shall cover only carbonaceous material or carbon which has been subjected to a high temperature in the presence of activating gases such as steam, carbon dioxide and others and has thereby acquired high adsorption power for gases and vapors. In explanation it might be said that the temperature usually required for such treatments are from about 700° C. up to 1100° C. The exact effect of the activating treatment is not definitely known but there is evidence to show that the activating gas produces a superficial oxidation of the walls of the pores and removes from the carbonaceous material the small amount of complex organic material nearly always present.

It will be obvious to those skilled in the art that various modifications and adaptations of the process and apparatus can be used in practicing the invention and that the invention is not limited to the details set forth in the foregoing examples.

I claim as my invention:

1. In a process of treating gases, adsorbing a gas by means of activated carbonaceous material, expelling the adsorbed gas within a closed system, condensing and liquefying the expelled gas within the closed system.

2. In a process of treating gases, adsorbing a gas by means of activated carbonaceous material, expelling the adsorbed gas within a closed system, cooling the expelled gas and liquefying same by transmitting thereto the pressure created by expelling the adsorbed gas from the activated material.

3. In a process of treating gases, adsorbing a gas at a low temperature in activated carbonaceous material, heating and expelling the adsorbed gas within a closed system, cooling the expelled gas and liquefying same by transmitting thereto the pressure created by expelling the adsorbed gas from the activated material.

4. In a process of treating gases, selectively adsorbing a gas from a mixture of a plurality of gases by means of activated carbonaceous material, allowing the unadsorbed gases to escape, expelling the adsorbed gas within a closed system, cooling the expelled gas and liquefying same by transmitting thereto the pressure created by expelling the adsorbed gas from the activated material.

5. In a process of treating gases, selectively adsorbing a gas from a mixture of a plurality of gases by means of activated carbonaceous material, allowing the unadsorbed gases to escape, expelling the adsorbed gas within a closed system, externally cooling the expelled gas and liquefying same by transmitting thereto the pressure created by expelling the adsorbed gas from the activated material.

6. In a process of treating gases, selectively adsorbing a gas from a mixture of a plurality of gases by means of activated carbonaceous material, allowing the unadsorbed gases to escape, expelling the adsorbed gas within a closed system by heating the adsorbent holding the gas, externally cooling the expelled gas, and liquefying same by transmitting thereto the pressure created by expelling the adsorbed gas from the activated material.

7. In a process of separating gases, passing a gaseous mixture into activated carbon and removing the adsorbable portion from said gaseous mixture by the activated carbon while allowing the unadsorbable portion to pass, expelling the adsorbed portion from the activated carbon by heating same and collecting the gaseous matter thus expelled.

8. In a process of separating gases, passing a gaseous mixture into activated carbon and removing the adsorbable portion from said gaseous mixture by the activated carbon while allowing the unadsorbable portion to pass, expelling the adsorbed portion from the activated carbon by heating same, and liquefying the gaseous matter thus expelled with the aid of cooling.

9. In a process of separating gases, passing a gaseous mixture into activated carbon and removing the adsorbable portion from said gaseous mixture by the activated carbon while allowing the unadsorbable portion to pass, expelling the adsorbed portion from the activated carbon by heating same, and liquefying the gaseous matter thus expelled with the aid of cooling and compressing.

10. In a process of separating gases, passing a gaseous mixture into activated carbon and removing the adsorbable portion from said gaseous mixture by the activated carbon while allowing the unadsorbable portion to pass, cooling the unadsorbed portion of the gaseous mixture, expelling the adsorbed portion from the activated carbon by heating same, cooling and compressing the gaseous matter thus expelled.

OSCAR L. BARNEBEY.